US005497716A

United States Patent [19]
Shoup

[11] Patent Number: 5,497,716
[45] Date of Patent: Mar. 12, 1996

[54] MECHANISM FOR CLEARING CROP RESIDUE

[76] Inventor: Kenneth E. Shoup, 145 SW. Ave., Kankakee, Ill. 60901

[21] Appl. No.: 236,567

[22] Filed: Apr. 29, 1994

[51] Int. Cl.⁶ ........................... A01B 5/00
[52] U.S. Cl. .................. 111/140; 111/166; 111/926; 172/140
[58] Field of Search ............... 111/118, 121, 111/123, 140, 154, 155, 156, 157, 167, 926; 172/166, 186, 583, 603, 742

[56] References Cited

U.S. PATENT DOCUMENTS

| | | | |
|---|---|---|---|
| 2,693,748 | 11/1954 | Kiser | 172/583 |
| 3,244,237 | 4/1966 | Keplinger et al. | 172/603 |
| 4,461,355 | 7/1984 | Peterson et al. | 172/166 X |
| 4,466,364 | 8/1984 | Hassenfritz | 172/166 X |
| 4,574,715 | 3/1986 | Dietrich, Sr. et al. | 111/140 X |
| 4,928,774 | 3/1990 | Bell | 172/742 X |
| 5,027,724 | 7/1991 | Ptacek et al. | 172/166 X |
| 5,361,848 | 11/1994 | Fleischer et al. | 172/186 X |

*Primary Examiner*—Terry Lee Melius
*Assistant Examiner*—Robert Pezzuto
*Attorney, Agent, or Firm*—Emrich & Dithmar

[57] ABSTRACT

A farm implement having a frame and a plurality of row units mounted on the frame with each row unit including a tool. Each row unit has at least one gauge wheel associated therewith with a spring urging each gauge wheel into contact with the soil to be worked by the tools. A single trash blade rotatably is mounted on an arm pivotally mounted on the frame associated with each gauge wheel ahead of the associated tool. A spring continually urges each trash blade toward contact with the soil ahead of the associated tool, with the plane of each trash blade being angularly displaced from the direction of travel of the associated gauge wheel in the range of from about 22° to about 30° and being angularly displaced to the vertical in the range of from about 20° to about 30° to move trash from ahead of the tool to form a row of trash between adjacent row units.

28 Claims, 7 Drawing Sheets

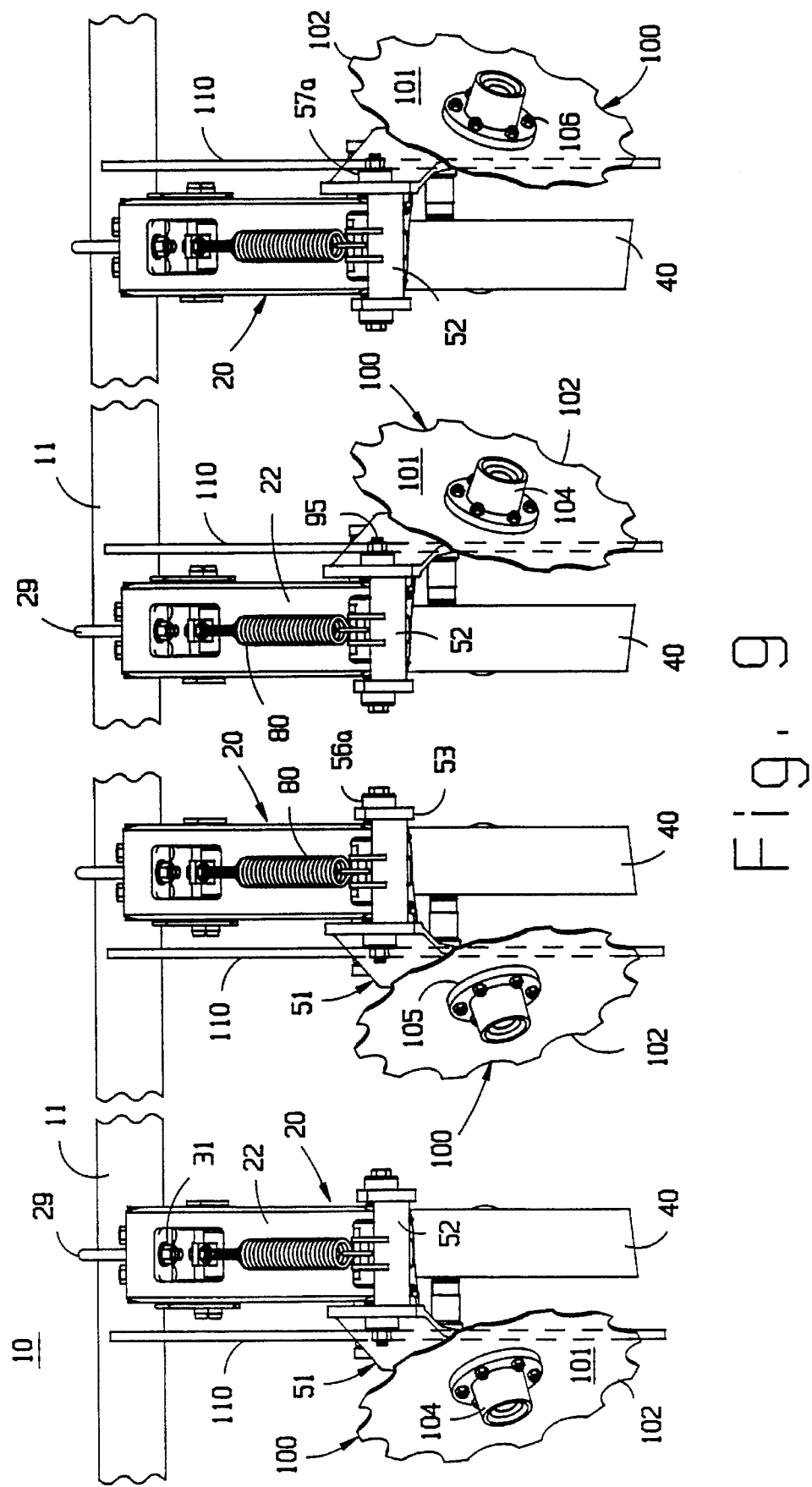

MECHANISM FOR CLEARING CROP RESIDUE

BACKGROUND OF THE INVENTION

The present invention relates generally to agricultural equipment and more particularly to apparatus for clearing crop residue hereinafter referenced to as trash, from a field prior to planting or cultivating, and is particularly useful in no till farming. No till farming is being utilized on increased acreage throughout the country in order to conserve time, wear and tear on equipment and for ecological reasons. One of the problems encountered with no till farming is the amount of trash present on the field in the next planting season which must be dealt with by the farmer during either cultivation or planting.

It is extremely important in planting to be able to achieve a relatively uniform seed depth and to this end there are a whole host of patents relating to that subject matter, representative examples being the Deckler U.S. Pat. No. 5,235,922, the Grataloup U.S. Pat. No. 4,594,951, the Westerfield U.S. Pat. No. 4,374,500. Moreover, there are a large number of prior art patents that relate to furrow opening and closing mechanisms associated with seed depth and seed dispensers in order to provide adequate planting conditions enabling the farmer to have uniformly planted crops wherein the opportunity for early and uniform seed germination is enhanced, see D. Brass, et al. U.S. Pat. No. 4,009,668. It should be understood that the citation of patents herein is not exhaustive by any manner but merely is illustrative of the kind of development and detail which is present in the farm art.

In a no till field, it is difficult to achieve either good furrow confirmation or good seed depth because of the amount of trash present on the field and it is to this problem which the present invention is directed.

SUMMARY OF THE INVENTION

Applicant, as a consequence, has designed an apparatus for effectively removing trash from in front of each row unit on a planter/cultivator so that the trash forms rows in the field between each of the row units of the planter, thereby providing a relatively clear space for the equipment which opens the furrow, plants the seed, adjusts the seed depth and closes the furrow or which cultivates. Moreover, the present invention is constructed and arranged to prevent the jamming of trash in between the trash blades and the associated mechanism thereby assuring freedom of rotation of the trash blades to perform their intended purpose. The invention also results in rows of trash which are small enough that they can decompose throughout the year allowing the farmer to shift or index his rows for planting the next year.

Accordingly, it is the principle object of the present invention to provide a trash blade positioned on a farm implement ahead of an associated tool and in conjunction with gauge wheel(s) of each row unit for clearing trash particularly from a no till field.

Another object of the present invention is to provide a trash blade which is inclined with respect to the direction of travel of the associated gauge wheel and also inclined from the vertical, thereby providing an improved construction.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 9 is a front view of a plurality of gauge wheels, coulters and trash blades mounted on a farm implement showing both the trash blades positioned so as to throw trash to the right and to the left thereby offsetting any side draft.

DETAILED DESCRIPTION OF THE PREFERRED EMBODIMENT

Figure 1:
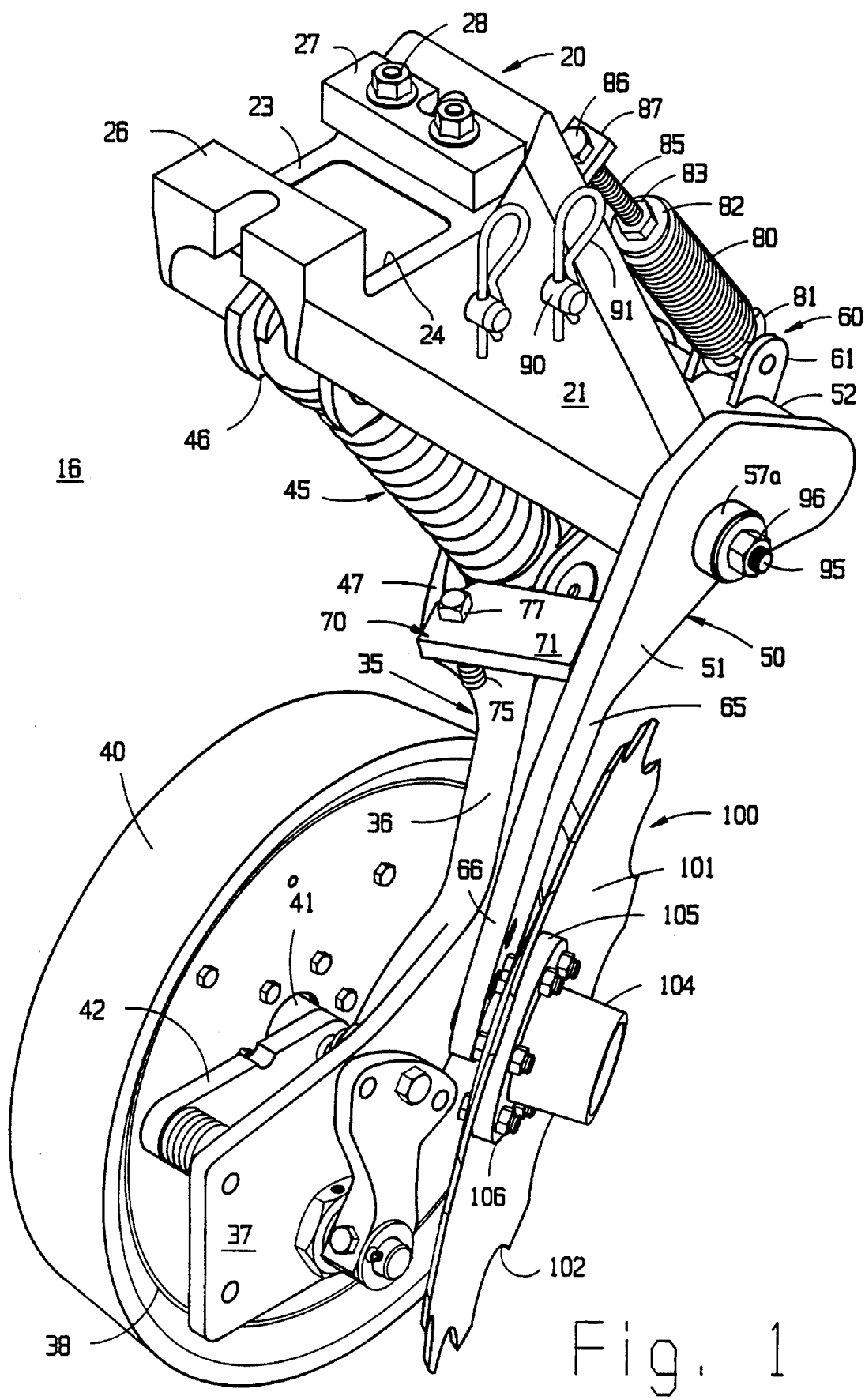
FIG. 1 is a perspective view of a gauge wheel and trash blade in the working position carried by a mounting bracket for attachment to a farm implement.
Figure 2:
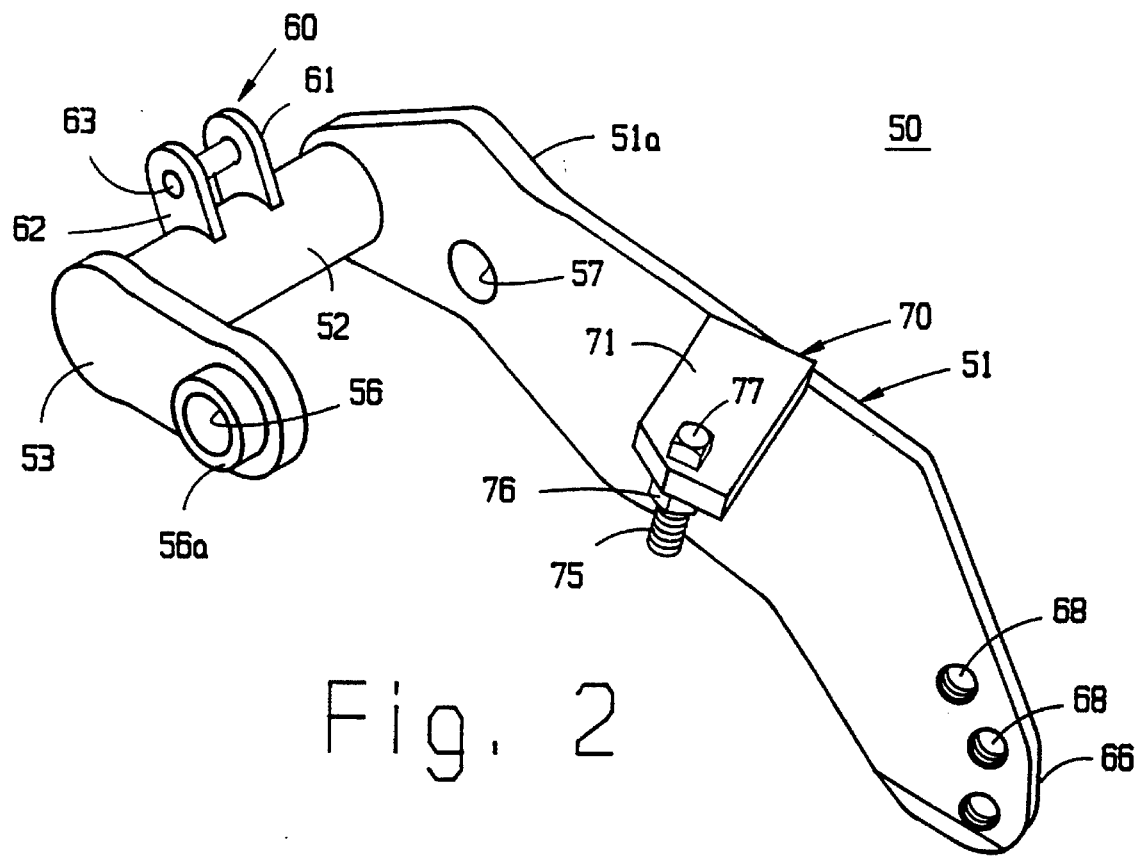
FIG. 2 is a perspective view of a trash blade mounting arm.
Figure 3:
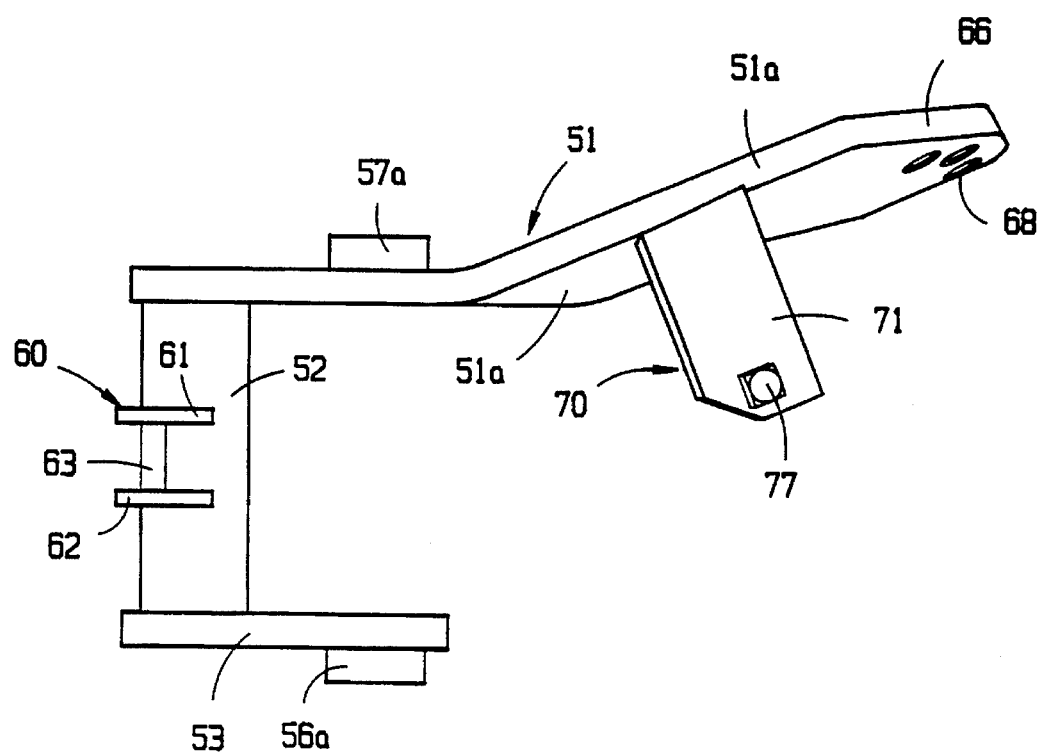
FIG. 3 is a top plan view of the trash blade mounting arm illustrated in FIG. 2.
Figure 4:
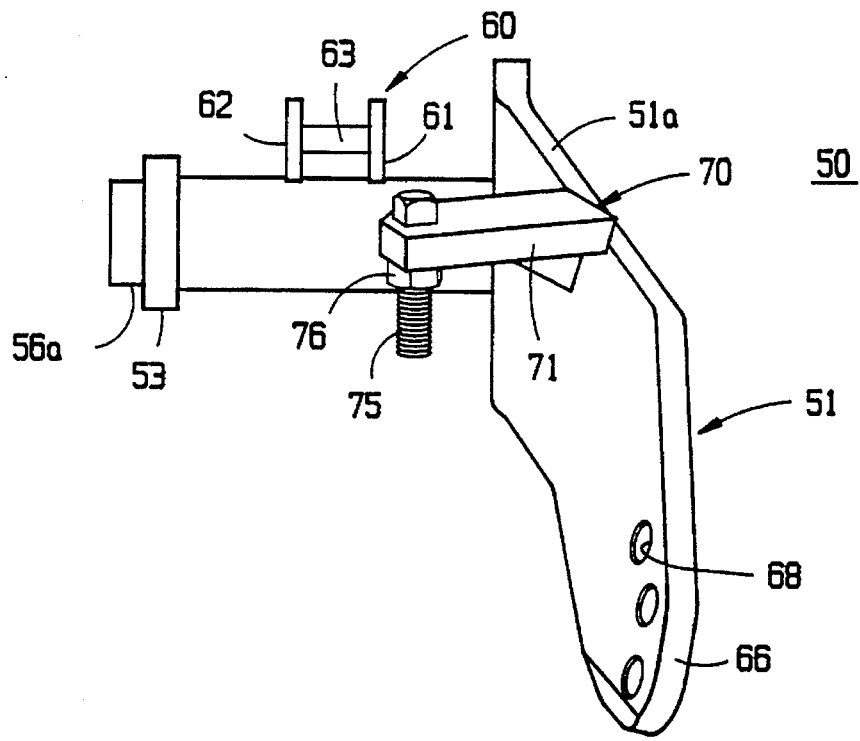
FIG. 4 is a rear view of the trash blade mounting arm illustrated in FIG. 2 as seen from the right side thereof.
Figure 5:
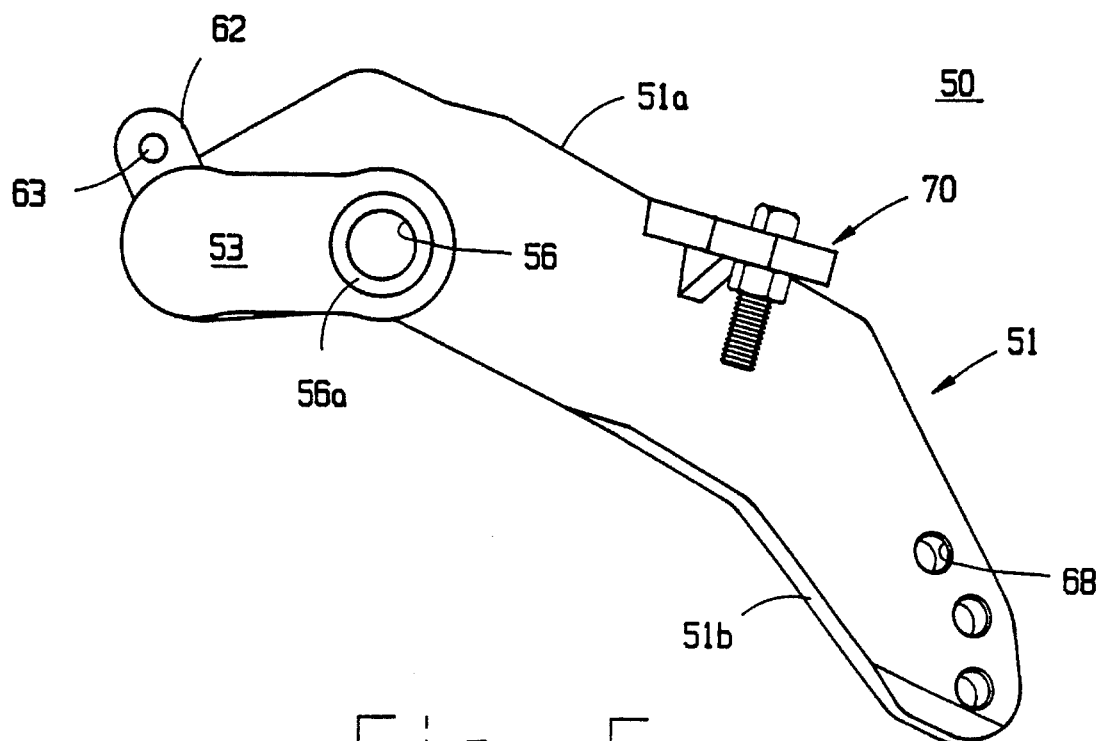
FIG. 5 is a side elevational view of the trash blade mounting arm illustrated in FIG. 2.

Referring now to FIGS. 1 and 9, there is illustrated a farm implement 10 which includes a frame 11 supporting a plurality of row units 15 and 16, the row units to the right of the farmer as the farm implement 10 is being driven through the field are denoted by the reference numeral 15 and the row units to the left of the farmer as the farm implement 10 is being driven through the field are denoted by the reference numeral 16. In order to avoid the problem of side draft, there is generally provided equal numbers of right side row units 15 and left side row units 16. Moreover, because the trash blades, as will be explained, move trash in one specific direction, it is preferable to have the units arranged as illustrated in order to facilitate next year's planting.

Figure 7:
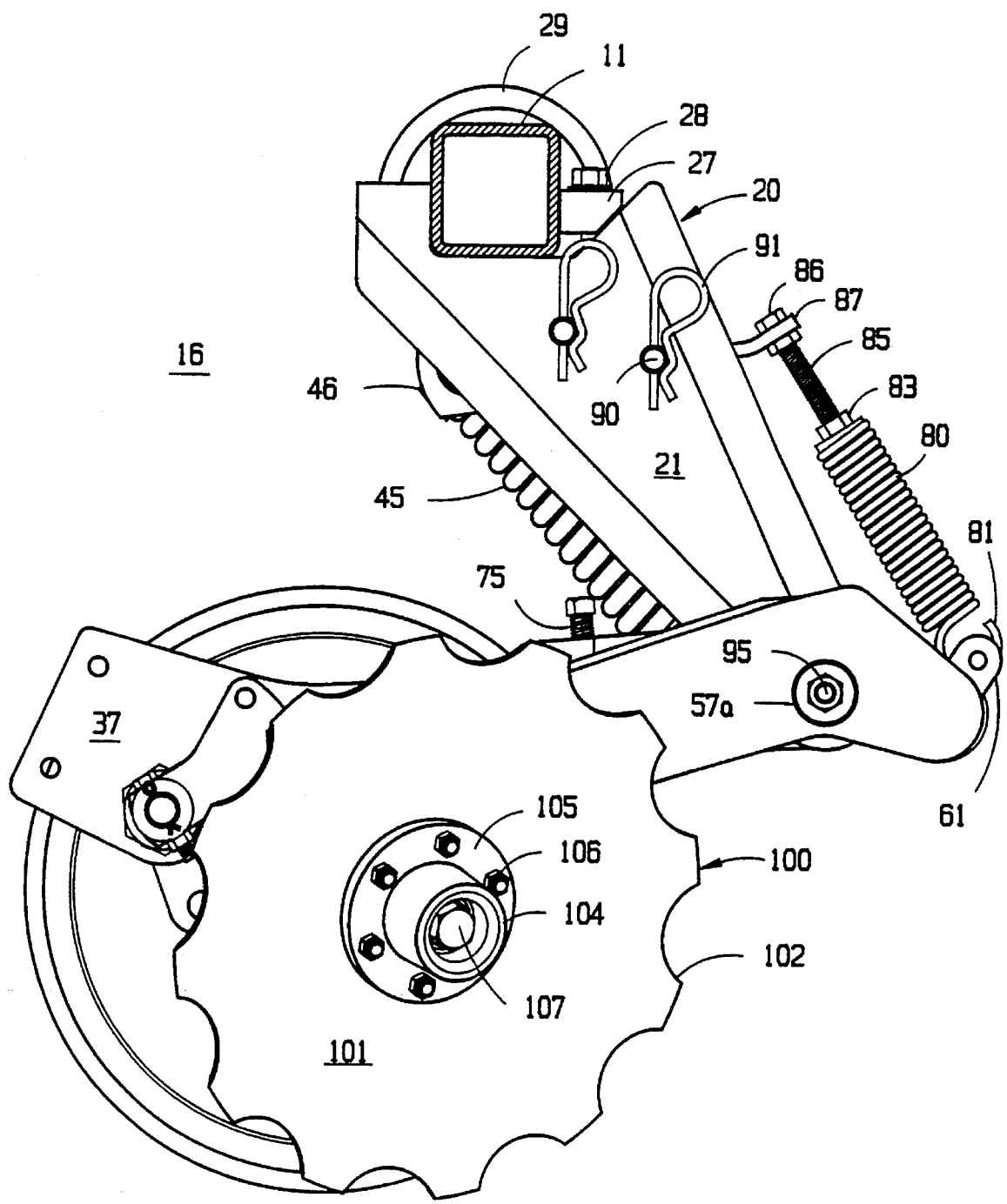
FIG. 7 is a view like FIG. 6 with the trash blade in the working position thereof.
Figure 8:
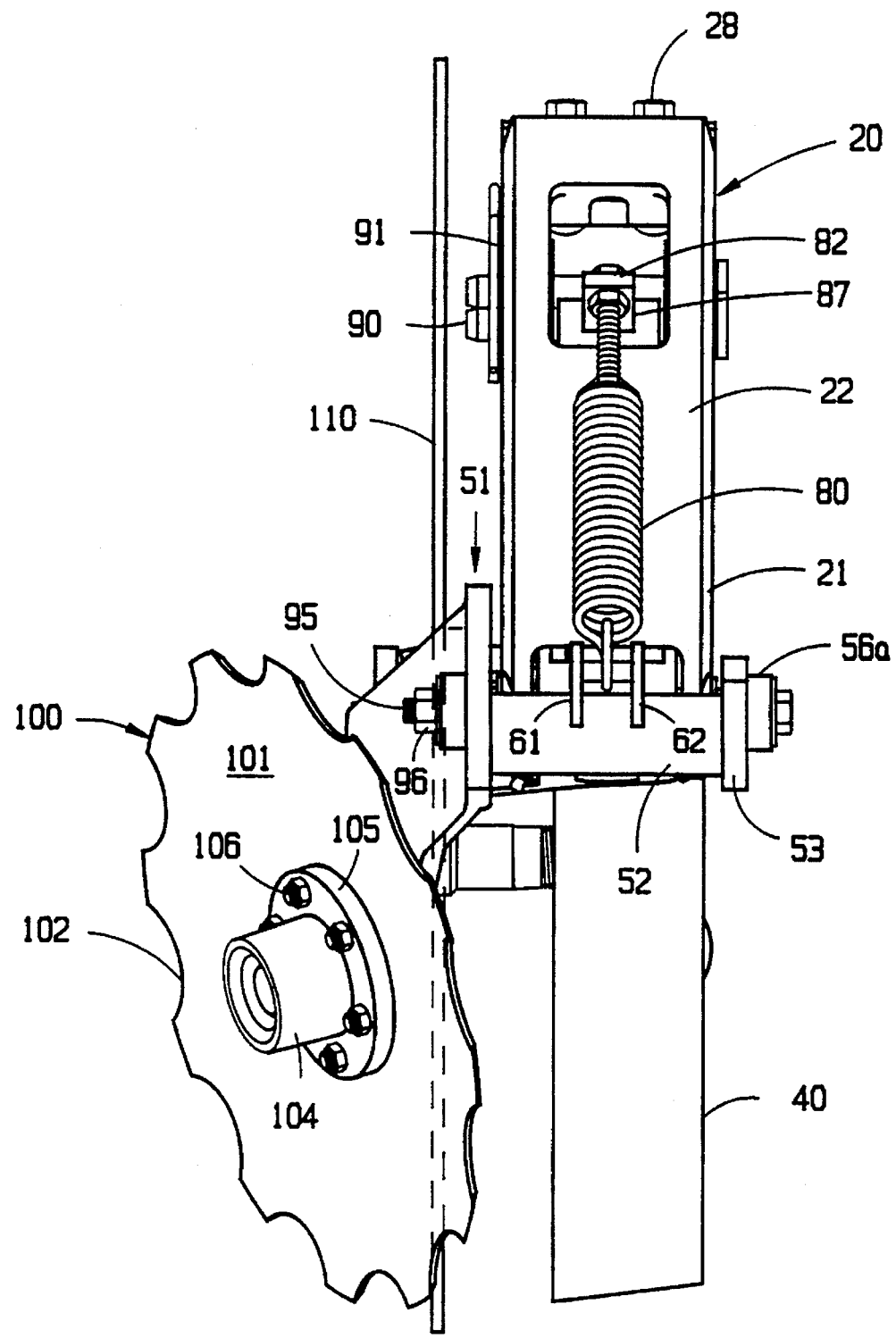
FIG. 8 is a front end view of the trash blade and a gauge wheel assembly illustrated in FIG. 1 with the addition of a coulter mounted between the gauge wheel and the associated trash blade.

Referring specifically to FIG. 1, each row unit 15 or 16 includes a mounting bracket 20 which includes a pair of triangular side plates 21 interconnected at the front by a front plate 22 (FIG. 9) and a top plate 23 provided with a central aperture 24, the front plate 22 also being provided with an aperture 25 as seen particularly in FIGS. 8 and 9. The mounting bracket 20 includes a raised abutment surface 26 at the rear thereof and a block 27 held by a pair of fasteners 28 at the front thereof. Each of the mounting brackets 20 is mounted to and held onto the associated farm implement frame 11 by means of a tie rod 29 illustrated particularly in FIGS. 7 and 9 with suitable fastening mechanisms 31.

Figure 6:
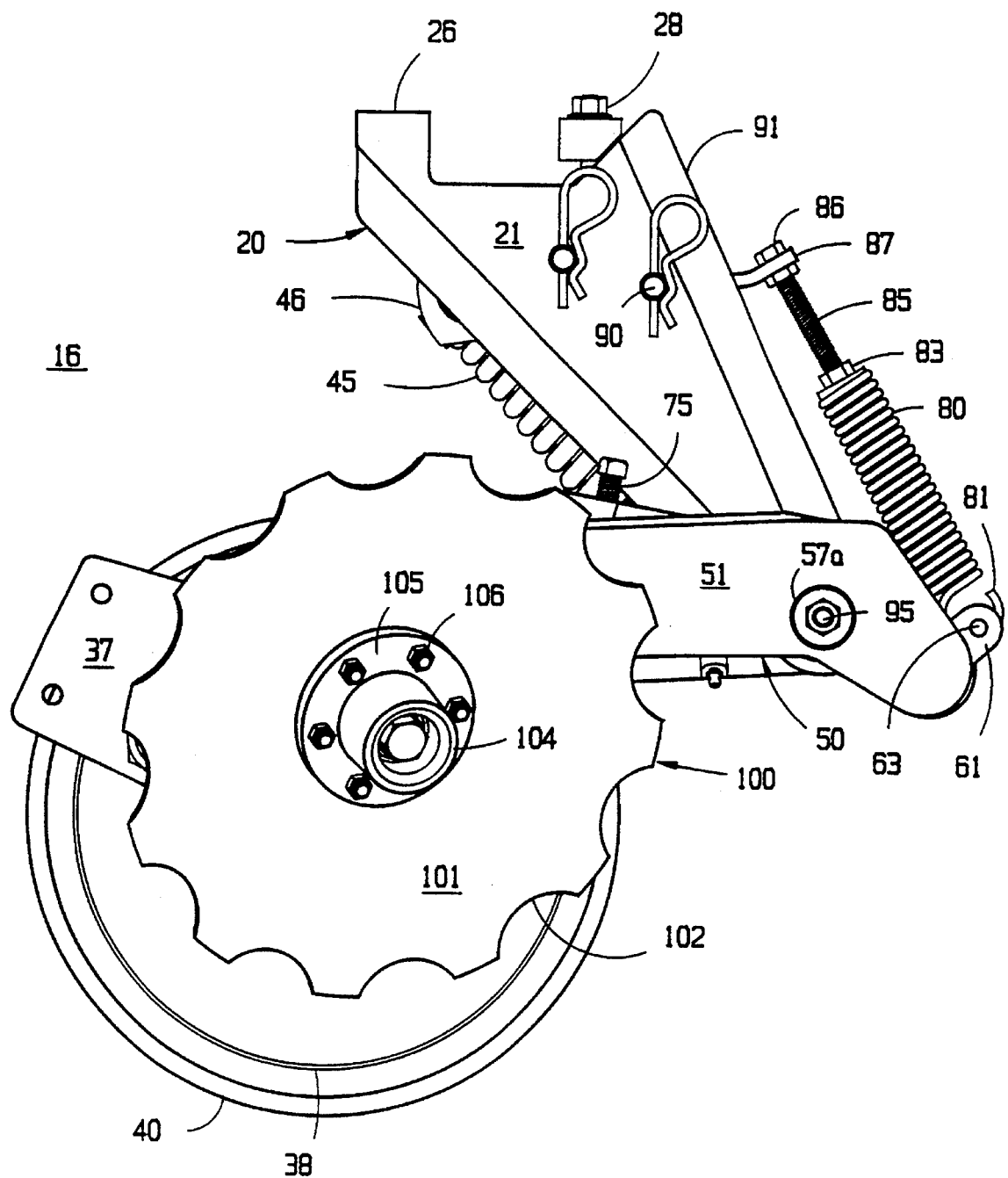
FIG. 6 is a side elevational view of the combination illustrated in FIG. 1 wherein the trash blade is in the raised or non-working position thereof.

As seen best in FIGS. 1, 6 and 7, a gauge wheel mounting assembly 35 includes an arm 36 which has one end thereof terminating in a portion 37 which carries on it a gauge wheel arm 42 having a shaft 41 on which is mounted a gauge wheel 40 which is positioned on a rim 38. It is understood by those skilled in the art that the gauge wheel 40 is rotatably mounted to the gauge wheel mounting assembly 35 and the gauge wheel arm 42 is pivotally mounted to the portion 37 of the assembly 35. A gauge wheel spring 45 is mounted both to the gauge wheel mounting assembly 35 and to the mounting bracket 20, the end 46 of the spring 45 being mounted to the bracket 20 and the end 47 of the spring being mounted to the gauge wheel mounting assembly 35 so as to provide constant urging of the gauge wheel 40 toward the soil over which the farm implement 10 passes.

Referring now to FIGS. 1 through 5, there is disclosed a trash blade mounting arm 50. The trash blade mounting arm 50 includes a general plate like structure 51 which has a cylinder 52 at one end thereof extending perpendicularly to the plate 51 near the cylinder 52 and carrying a link 53 at the other end thereof, the link 53 being provided with an aperture 56 surrounded by outwardly extending bearing surface 56a. The plate 51 is also provided with an aperture 57 and an exterior bearing surface 57a, see FIGS. 3 and 8. The cylinder portion 52 of the trash blade mounting arm 50 has a spring mounting mechanism 60 which includes a pair of upstanding tabs 61 and 62 interconnected by a rod or bar 63. The portion 51a of the plate 51 distal to the cylinder 52 is angled in two directions. The plate 51 is angled so that a blade mounted thereon, as will be explained, is angled toward the associated gauge wheel 40 and is also angled away from the vertical, illustrated at 51b in FIG. 5.

More importantly, the trash blade mounting arm 50 and particularly the plate portions 51a and 51b are bent in two different directions to provide a particular angular orientation of the associated trash blade 100, as will be explained in the range of about 20° to about 30° to the line of travel of the associated gauge wheel 40 and in the range of about 20° to about 30° to the vertical, for reasons hereinafter set forth.

Finally, there are provided three mounting apertures 68 at the distal end of the plate 51 to provide yet another adjustment feature for the associated trash wheel 100, as will be explained. Depth adjustment mechanism 70 consists of a plate 71 welded to the plate 51 and extending generally outwardly therefrom in a direction toward the associated gauge wheel mounting assembly 35 when the trash blade mounting arm 50 is mounted on the mounting bracket 20, as will be explained. The plate 71 carries a threaded stud 75 which has a lock nut 76 and a hex head 77, as is well understood in the art to provide for a vertical adjustment feature, as will be explained.

When the trash blade mounting arm 50 is mounted to the mounting bracket 20 there is provided a spring 80 having a hook portion 81 around the bar 63 of the spring mount assembly 60 with a casting 82 threaded into the spring 80. The casting 82 has a hex nut 83 threadably mounted on an exteriorly threaded shaft 85 retained by means of an hex head 86 onto a bracket 87, the bracket 87 being mounted to a pin 90 which extends throughout the sides 21 of the mounting bracket 20 and retained therein by means of a cotter pin 91. The spring 80 serves continually to urge the trash blade mounting arm 50 and the trash blade 100 associated therewith toward the soil over which the gauge wheel 40 and the farm implement 10 travels.

Since the threaded fastener 75 contacts the arm 36 of the gauge wheel mounting assembly 35 the vertical position of the trash blade mounting arm 50 and hence the trash blade 100 mounted thereon can be adjusted with respect to the gauge wheel 40 by rotating the stud 75, as will be explained. Finally, a pin 95 extends through the sides 21 of the mounting bracket 20 and serves to mount both the trash blade mounting arm 50 and the gauge wheel mounting assembly 35 onto the mounting bracket 20, the pin 95 extending through both bearings 56a and 57a and being maintained in place by a suitable fastener 96.

The trash blade 100 is of the concave type and may have a serrated, fluted or scalloped peripheral edge 102 depending upon the type of trash to be moved. More particularly the trash blade 100 has a concave surface 101 and an illustrated fluted periphery 102. Moreover, a finger-type wheel may be substituted for light trash, for instance residue from soy beans. Centrally of the blade 100 is a bearing hub 104 having a collar 105 through which extend various fasteners 106, the hub 104 being adapted to sit on a stub shaft 107 which extends from the associated trash blade mounting arm 50. As seen particularly in FIGS. 8 and 9, a coulter 110 may also be mounted on the shaft 41 positioned between the associated gauge wheel 40 and trash blade 100 for purposes of cultivation.

As seen from the drawings, the gauge wheel 40 is continually urged toward the soil on which it rides by means of the coil spring 45, all as is well known in the art. The associated trash blade mounting arm 50 with the depth adjustment mechanism 70 associated therewith follows the gauge wheel 40 and particularly the gauge wheel mounting assembly 35 so that as the gauge wheel 40 moves upwardly it carries the trash blade mounting arm 50 and the blade 100 associated therewith upwardly also. Movement downwardly of the gauge wheel 40 is followed by the trash blade mounting arm 50 by means of the spring 80 which is in and of itself adjustable through the threaded shaft 85 and the associated mechanism previously described.

Of significance to the efficient operation of the invention is the angular disposition of the trash blade 100 with respect to the gauge wheel 40 and particularly to the line of travel of the gauge wheel 40, as illustrated in FIGS. 3–5, 8 and 9. The trash blade 100 is inclined or angularly displaced with respect to the gauge wheel 40 and its line of travel in two different aspects. First, the trash blade 100 is inclined with respect to the vertical and it is inclined in this direction not more than 30 degrees and preferably 24 degrees so as to insure that the trash blade 100 continually rotates during transportation of the farm implement 10 throughout the field. In experiments, it was found that if the trash blade 100 is inclined at a 60° angle to the vertical it would quit turning almost immediately and even at 45° the trash wheel 100 would intermittently cease to turn. When the trash wheel 100 does not turn it does not efficiently move trash out of the way in the preferred manner but acts as a plow rather than as a cutting and efficient distribution mechanism. Therefore, the blade 100 should be inclined from the vertical preferably about 24 degrees but not greater than an amount which insure that the blade 100 will continually rotate during travel throughout the field. It is believed at the present time that the maximum angle from the vertical which will accomplish this is approximately 30 degrees but it may be somewhat more.

The trash blade 100 is also angularly displaced from the line of travel of the gauge wheel 40. If the blade is at 90 degrees to the ground or parallel to the line of travel of the gauge wheel 40 it must cut into the soil too deeply in order to move the associated trash out of the way, when the blade 100 is in the working position thereof as illustrated in FIG. 7. By inclining the blade 100 with respect to the line of travel of the gauge wheel 40, the wheel 100 still rotates but also acts like a wedge permitting the trash blade 100 to ride up over the soil rather than penetrating the soil and moving it out of the way like a plow. It has been found that the degree of inclination with respect to the line of travel of the gauge wheel 40 is in the range of about 20 degrees to about 30 degrees, the preferred angular orientation being about 25 degrees and the more preferred range being from about 22 degrees to about 30 degrees. When the trash blade 100 is positioned in the range of from about 22 degrees to about 30 degrees to the line of travel to the gauge wheel 40 and tilted from the vertical less than about 30 degrees an ovate surface is presented to the trash in the field which is a more efficient surface permitting both rotation of the blade 100 and removal of the trash in a most efficacious manner. As seen in FIG. 6, the blade 100 may be moved into a raised or non-working position wherein the blade 100 is out of contact with the soil.

Although the invention has been described with a single gauge wheels 40, it is applicable to planters which generally use two gauge wheels for each row unit 15, 16 as well as to cultivators which use a single gauge wheel 40 to each row unit 15, 16. Moreover, the blade 100 may be anywhere from a few inches to 2½ feet or so ahead of the associated tool, again depending upon what type of farm implement is being used. Planters require openers and other mechanisms which would require that the trash blade 100 be moved forwardly whereas if a cultivator is used then the trash blade 100 need not be positioned as far forward as with a planter. The important aspect of the invention is angular position of the trash blade 100 with respect to the vertical and to the line of travel of the farm implement at each row unit 15, 16 most conveniently, there may be sold a combination of a gauge wheel 40 and the associated mounting mechanism, a trash blade 100 and associated mounting mechanism and a coulter 110 all for use principally in no till acreage. As previously mentioned, a significant advantage of the present invention is that by using a single trash blade 100 for each row unit 15, 16 the amount of trash thrown is less than when using two trash blades and by moving trash to the right and to the left as illustrated in FIG. 9 side draft is avoided and trash is aligned in between alternate planting rows so that the following year the farmer merely has to index one row for planting, the trash from the prior year having decayed over an intervening twelve months.

While there has been disclosed what is considered to be the preferred embodiment of the present invention, it is understood that various changes in the details may be made without departing from the spirit, or sacrificing any of the advantages of the present invention.

I claim:

1. In combination, a farm implement including a frame and a plurality of row units mounted on the frame, each row unit including a tool, each row unit having a gauge wheel associated therewith, a trash blade mounted on the frame associated with each gauge wheel ahead of the associated tool, and means urging each gauge wheel and each trash blade toward contact with the soil, the trash blade being angularly displaced from the vertical and from the direction of travel of the associated gauge wheel to move trash from ahead of the tool to form a row of trash between adjacent row units.

2. The combination of claim 1, wherein said trash blade is continually urged toward contact with the soil by a spring separate from and acting independently of said means urging the gauge wheels toward the soil.

3. The combination of claim 2, and further comprising depth adjustment mechanism operatively connected to said trash blade for adjusting the depth of said trash blade with respect to the associated gauge wheel such that the gauge wheel influences vertical movement of said trash blade as the gauge wheel moves upwardly and downwardly through a field.

4. The combination of claim 3, wherein each gauge wheel and the associated trash blade are pivotally mounted to the frame on a shaft extending from said frame.

5. The combination of claim 1, wherein said trash blade is angularly displaced from the vertical not greater than 30°.

6. The combination of claim 5, wherein said trash blade is angularly displaced from the vertical about 24°.

7. The combination of claim 1, wherein said trash blade is angularly displaced from the line of travel of the gauge wheel not more than 30°.

8. The combination of claim 7, wherein said trash blade is angularly displaced from the line of travel of the gauge wheel in the range of from about 20° to about 30°.

9. The combination of claim 8, wherein said trash blade is angularly displaced about 25°.

10. The combination of claim 1, wherein said trash blade is angularly displaced from the vertical more than 20° and less than about 30° and is angularly displaced from the line of travel of the gauge wheel not less than about 22° and not more than about 30°.

11. The combination of claim 10, wherein the trash blade is a concave blade.

12. The combination of claim 1, wherein the tool for each row unit is a planter.

13. In combination, a farm implement including a frame and a plurality of row units mounted on the frame, each row unit including a tool, each row unit having at least one gauge wheel associated therewith, a single trash blade rotatably mounted on an arm pivotally mounted on the frame associated with each gauge wheel ahead of the associated tool and means continually urging each gauge wheel and each trash blade toward contact with the soil ahead of the associated tool, each trash blade being angularly displaced from the direction of travel of the associated gauge wheel in the range of from about 22° to about 30° and being angularly displaced to the vertical in the range of from about 20° to about 30° to move trash from ahead of the tool to form a row of trash between adjacent row units.

14. The combination of claim 13, wherein said trash blade is continually urged toward contact with the soil by a spring separate from and acting independently of said means urging the gauge wheels toward the soil.

15. The combination of claim 14, and further comprising depth adjustment mechanism operatively connected to said trash blade for adjusting the depth of said trash blade with respect to the associated gauge wheel such that the gauge wheel influences vertical movement of said trash blade as the gauge wheel moves upwardly and downwardly through a field.

16. The combination of claim 13, wherein said trash blade is rotatably mounted on a trash blade mounting arm pivotally mounted on the farm implement frame, said trash blade arm having a portion thereof disposed about 24° from the vertical and a portion thereof disposed about 25° from the line of travel of the associated gauge wheel.

17. The combination of claim 13, wherein the trash blade is a concave blade.

18. The combination of claim 13, wherein the tool for each row unit is a planter.

19. In combination, a gauge wheel arm having a gauge wheel rotatably mounted thereon and means for mounting said gauge wheel arm to the frame of a farm implement, a trash blade mounting assembly having means accommodating mounting of said trash blade mounting assembly ahead of said gauge wheel to the frame of the farm implement for movement between a working position and a non-working position, a trash blade rotatably mounted on said trash blade mounting assembly, spring means for urging said gauge wheel and said trash blade into contact with the ground, said trash blade mounting assembly when mounted to the farm implement frame being constructed and arranged to position said trash blade angular relationship to said gauge wheel such that the plane of said trash blade is angularly displaced from the direction of travel of said gauge wheel in the range of from about 22° to about 30° and angularly displaced from the vertical in the range of from about 20° to about 30°.

20. The combination of claim 19, wherein said trash blade in concave.

21. The combination of claim 20, wherein said trash blade is angularly disposed from direction of travel of said gauge wheel about 25°.

22. The combination of claim 21, wherein said trash blade is angularly disposed from the vertical about 24°.

23. The combination of claim 19, wherein the tool for each row unit is a planter.

24. In combination, a farm implement including a frame and a plurality of row units mounted on the frame, each row unit including a tool, each row unit having a gauge wheel associated therewith, a trash blade mounted on the frame associated with each gauge wheel ahead of the associated tool for movement upwardly independently of said gauge wheel, and means urging each gauge wheel and each trash blade toward contact with the soil, and means for limiting said trash wheel from movement downwardly independently of said gauge wheel, the trash blade being angularly displaced from the vertical and from the direction of travel of the associated gauge wheel to move trash from ahead of the tool to form a row of trash between adjacent row units.

25. The combination of claim 24, wherein said trash blade is angularly displaced from the vertical more than 20° and less than about 30° and is angularly displaced from the line of travel of the gauge not less than about 22° and not more than about 30°.

26. The combination of claim 24, wherein each gauge wheel and the associated trash blade are pivotally mounted to the frame on a common shaft.

27. The combination of claim 24 and further comprising means for permitting upward movement of said trash blade independently of said associated gauge wheel.

28. The combination of claim 24, wherein the tool for each row unit is a planter.

* * * * *